US008843154B2

(12) United States Patent
Hu

(10) Patent No.: US 8,843,154 B2
(45) Date of Patent: Sep. 23, 2014

(54) METHOD AND MOBILE SWITCHING CENTER (MSC) FOR IMPLEMENTING LOAD RE-DISTRIBUTION

(75) Inventor: Shuailai Hu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 277 days.

(21) Appl. No.: 13/510,351

(22) PCT Filed: Sep. 13, 2010

(86) PCT No.: PCT/CN2010/076842
§ 371 (c)(1),
(2), (4) Date: May 17, 2012

(87) PCT Pub. No.: WO2011/060663
PCT Pub. Date: May 26, 2011

(65) Prior Publication Data
US 2012/0220297 A1 Aug. 30, 2012

(30) Foreign Application Priority Data

Nov. 18, 2009 (CN) .......................... 2009 1 0223390

(51) Int. Cl.
*H04W 72/00* (2009.01)
*H04W 28/08* (2009.01)
*H04W 68/00* (2009.01)
*H04W 88/14* (2009.01)
*H04W 8/26* (2009.01)

(52) U.S. Cl.
CPC .............. *H04W 28/08* (2013.01); *H04W 68/00* (2013.01); *H04W 88/14* (2013.01); *H04W 8/26* (2013.01)
USPC ........ 455/453; 455/435.1; 455/436; 455/439; 455/442; 455/433

(58) Field of Classification Search
CPC ....... H04W 28/08; H04W 8/005; H04W 8/04; H04W 8/06; H04W 8/10; H04W 8/12; H04W 8/14; H04L 69/40
USPC ............ 455/428, 432.1, 433, 435.1, 439, 453
See application file for complete search history.

(56) References Cited

U.S. PATENT DOCUMENTS 6,185,421 B1 * 2/2001 Alperovich et al. .......... 455/433
6,330,444 B1 * 12/2001 Rune et al. .................... 455/433

(Continued)

FOREIGN PATENT DOCUMENTS

| CN | 1489414 A | 4/2004 |
| CN | 101146316 A | 3/2008 |
| CN | 101350960 A | 1/2009 |

OTHER PUBLICATIONS

International Search Report for PCT/CN2010/076842 dated Dec. 10, 2010.

*Primary Examiner* — Dai A Phuong
(74) *Attorney, Agent, or Firm* — Ling Wu; Stephen Yang; Ling and Yang Intellectual Property

(57) ABSTRACT

A method for implementing load redistribution is disclosed in the present invention, and the method includes that: when a Mobile Switching Center (MSC) node in a MSC pool needs the load redistribution, the MSC node sequentially performs paging processing on UEs in a Visitor Location Register of the MSC node according to a set paging rate and distributes a Temporary Mobile Subscriber Identity including Null-Network Resource Identifier and a Non-broadcast Location Area Identity to UEs which return paging responses, thereby realizing the load redistribution of the MSC node. A MSC for implementing load redistribution is also disclosed in the present invention, and the MSC includes a load redistribution processing module and a transmitting module.

12 Claims, 1 Drawing Sheet

(56) References Cited

U.S. PATENT DOCUMENTS

| | | | |
|---|---|---|---|
| 6,625,473 B1* | 9/2003 | Seok | 455/560 |
| 7,860,520 B2* | 12/2010 | Jia et al. | 455/458 |
| 2006/0229090 A1* | 10/2006 | LaDue | 455/507 |
| 2007/0270127 A1* | 11/2007 | Santoro et al. | 455/411 |
| 2009/0209252 A1* | 8/2009 | Han et al. | 455/433 |
| 2010/0097974 A1* | 4/2010 | Ye et al. | 370/312 |
| 2011/0117946 A1* | 5/2011 | Vainola et al. | 455/509 |

* cited by examiner

US 8,843,154 B2

METHOD AND MOBILE SWITCHING CENTER (MSC) FOR IMPLEMENTING LOAD RE-DISTRIBUTION

TECHNICAL FIELD

The present invention relates to the Mobile Switching Center (MSC) POOL technology in the field of communications, and more especially, to a method for implementing load redistribution and a mobile switching center thereof.

BACKGROUND OF THE RELATED ART

In the MSC POOL networking, in some scenarios, such as avoiding over-load prevention, equipment upgrade and so on, network operators need to move the load of a certain MSC node in the MSC POOL to another MSC node in the MSC POOL, thus to realize load redistribution. In the load redistribution process, in order to achieve the purpose of reducing the impact on the terminal users and other network element entities as possible, the 3rd Generation Partnership Project (3GPP) protocol defines a "two-stage" implementation mechanism for the circuit switch (CS) domain, the specific process is as follows:

step 1: the operator uses the Operations and Maintenance (O&M) command to initiate a load redistribution process for a certain MSC node, and enters into the first stage;

step 2: in the first stage, when the user equipment (UE) performs the location update or International Mobile Subscriber Identity (IMSI) attach and the MSC receives a Location Update or an Attach Request sent by the UE, one Temporary Mobile Subscriber Identity (TMSI) including a null-Network Resource Identifier (Null-NRI), that is the Null-NRI, is distributed to the UE, moreover, a Non-broadcast Location Area Identity (Non-broadcast LAI) is included in the response message;

step 3: after the UE receives the non-broadcast location area identity, it uses the previously distributed TMSI to perform the location update immediately, since it is the Null-NRI contained in the TMSI, the Non Access Stratum (NAS) Node Selection Function (NNSF) entity module will route the UE to one new MSC node;

step 4: The first stage lasts two periodic location update cycles, thus ensuring that most of the UEs have completed at least one location update, and for those UEs which don't perform the location update due to service being kept continuously in the first stage, they will be processed in the subsequent second stage;

step 5: in the second stage, the MSC sequentially processes the UEs whose services are kept and initiates a TMSI redistribution process, and distributes a TMSI including the Null-NRI and a non-broadcast location area identity to the UE;

step 6: after completing the current service, the UE uses the newly distributed TMSI to perform the location update immediately because a non-broadcast location area identity is received, and since the TMSI contains the null-NRI, the NNSF entity module routes the UE to one new MSC node.

The main disadvantage of the aforementioned process is that the first stage has a long duration. Although the time length of the periodic location update cycle can be configured by the operator, it usually takes 30 minutes to 90 minutes. In some special application scenarios, such as when the mobile switching center is in need of emergent maintenance, hardware/software upgrades as well as a load redistribution process is initiated before exiting the service, and the load redistribution processing takes too long time, which might damage the timeliness of the maintenance.

SUMMARY OF THE INVENTION

The technical problem to be solved in the present invention is to provide a method and mobile switching center for implementing load redistribution to optimize the load redistribution process and implement the fast load redistribution.

In order to solve the above problem, the present invention discloses a method for implementing fast load redistribution, comprising:

when a mobile switching center (MSC) node in a MSC pool needs load redistribution, the MSC node, according to a set paging rate, sequentially performs paging processing on UEs in a visitor location register of the MSC node and distributes a Temporary Mobile Subscriber Identity (TMSI) including null network resource identifier (null-NRI) and a non-broadcast location area identity to UE that returns a paging response, thereby achieving the load redistribution of the MSC node.

The method further comprises:

in the load redistribution process of the MSC node, if the MSC node receives a location update or attach request which is initiated by a certain UE to the MSC node, the MSC node distributes a TMSI including null-NRI and a non-broadcast location area identity to the UE.

The visitor location register of the MSC node comprises identification information indicating whether the load redistribution is performed on each UE or not, wherein, the identification information indicating whether the load redistribution is performed or not is configured by the MSC node in a process of the UE initiating the location update or attach request;

before the step of the MSC node performing the paging processing on each UE in the visitor location register, the method further comprises: according to the identification information indicating whether the load redistribution is performed or not, the MSC node judges whether the load redistribution is performed on UE or not, and only performs the paging processing on the UE on which the load redistribution is not performed.

The set paging rate is calculated according to the following formula:

$$V_{page}=C*(N_{sms}+N_{mt})/3600$$

wherein, the $V_{page}$ is "dummy paging" rate; and C is user capacity of MSC office;

$N_{sms}$ is the number of times that a user short message is called when busy; and $N_{mt}$ is the number of times that a user call is called when busy;

the "dummy paging" refers that the MSC node awakes a user through active paging and performs the load redistribution.

The MSC node distributes a TMSI including Null-NRI and a non-broadcast location area identity to the UE that returns the paging response through a TMSI redistribution message.

To solve the aforementioned problem, the present invention also discloses a mobile switching center (MSC) for implementing load redistribution, and the MSC comprises a load redistribution processing module and a transmitting module:

the load redistribution processing module is configured to: when the MSC is a MSC that needs the load redistribution in a MSC pool, according to a set paging rate, sequentially perform paging processing on UEs in a visitor location register of the MSC, as well as receive a paging response returned by the UE, and send information of the UE that returns the paging response to the transmitting module;

the transmitting module is configured to: receive the information of the UE that returns the paging response sent by the load redistribution processing module, and distribute a Temporary Mobile Subscriber Identity (TMSI) including null network resource identifier (null-NRI) and a non-broadcast location area identity to the UE.

The load redistribution processing module is also configured to: in a load redistribution process of the MSC, receive a location update or attach request which is initiated by the UE to the MSC and send information of the UE that initiates the location update or attach request to the transmitting module;

the transmitting module is also configured to: receive the information of the UE that initiates the location update or attach request sent by the load redistribution processing module, and distribute a TMSI including Null-NRI and a non-broadcast location area identity to the UE that initiates the location update or attach request.

The load redistribution processing module is configured to:

in a process of the UE initiating a location update or attach request, configure identification information indicating whether the load redistribution is performed or not for each UE in the visitor location register; and before the load redistribution processing module performs the paging processing on each UE, judge whether the load redistribution is performed on UE or not according to the identification information indicating whether the load redistribution is performed or not, and only perform the paging processing on the UE on which the load redistribution is not performed.

The set paging rate is calculated according to the following formula:

$$V_{page}=C*(N_{sms}+N_{mt})/3600$$

wherein the $V_{page}$ is "dummy paging" rate; and C is user capacity of MSC office;

$N_{sms}$ is the number of times that a user short message is called when busy; and $N_{mt}$ is the number of times that a user call is called when busy;

the "dummy paging" refers that the MSC awakes a user through active paging and performs the load redistribution.

The transmitting module is configured to distribute a TMSI including the null-NRI and a non-broadcast location area identity to the UE that returns the paging response via TMSI redistribution message.

The technical solution of the present invention awakes a user through active paging on the basis of the 3GPP TS 23.236 protocol, and thereby it can effectively reduce the time consumed by the load redistribution, achieve fast load redistribution, and improve the efficiency of network operation by cooperating with the first stage processing mechanism in the existing load redistribution process.

PREFERRED EMBODIMENTS OF THE PRESENT INVENTION

The main idea of the present invention is that on the basis of the 3GPP TS 23.236 protocol, the MSC can awake the user through active paging (called "dummy paging" later in this article, which is used for distinguishing it from the called subscriber paging in the normal service process) so as to perform the load redistribution. In the load redistribution process, the first stage processing mechanism in the existing load redistribution process can be cooperated with to effectively shorten the time consumed by the load redistribution.

The technical scheme of the present invention will be described in further detail in the following in combination with the accompanying drawings and specific embodiments.

Figure 1:
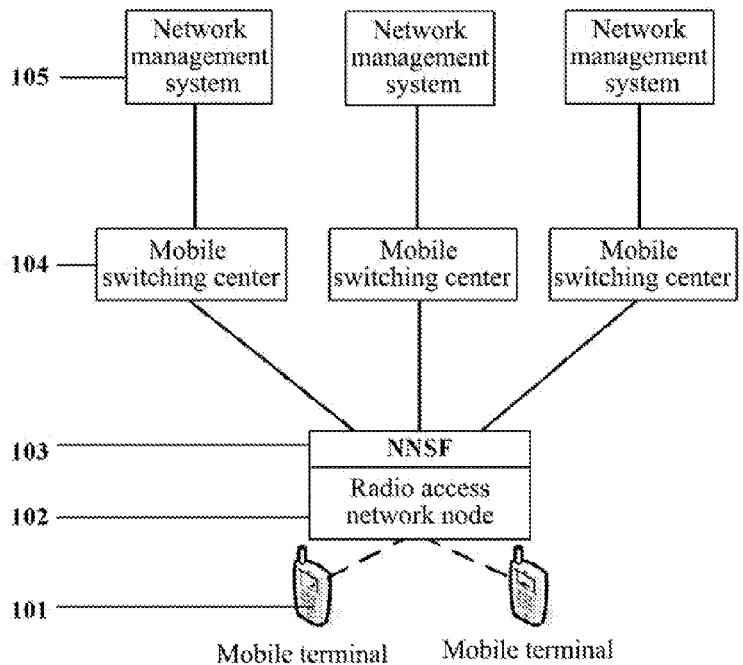
FIG. 1 is a structural diagram of a system for implementing "dummy paging" fast load redistribution function in accordance with the present invention.

A system for implementing fast load redistribution, as shown in FIG. 1, comprises a mobile terminal 101, a radio access network node 102, a NNSF module 103, a mobile switching center 104 and a network management system 105. Wherein:

the mobile terminal 101 is configured to: access the mobile switching center via the radio access network node;

the radio access network node 102 is configured to: connect with the mobile switching center, and connect with multiple mobile switching centers during the MSC POOL networking;

the NNSF module 103 is configured to: be mainly responsible for selecting one serving mobile switching center for a mobile terminal in accordance with the principle of load balancing when the mobile terminal accesses the network through the radio access network node;

the Mobile Switching Center (MSC) 104 is configured to: control the mobile terminal through a radio access network node, and work together with the radio access network to provide mobile communications services for the mobile terminal;

specifically, MSC might comprise a load redistribution processing module and a transmitting module:

the load redistribution processing module is configured to: when a certain MSC node needs the load redistribution (that is, it receives a "dummy paging" fast load redistribution command initiated by the network management system 105), according to the set paging rate (the paging rate is set by the operator), perform the paging processing on the UEs in the Visitor Location Register (VLR) of the MSC node in turn, as well as receive paging responses returned by UEs, and send the information of the UEs that return the paging responses to the transmitting module;

meanwhile, the load redistribution processing module can also be configured to: receive the location update or attach request initiated by UE to the MSC node, and send the information of the UE that initiates the location update or attach request to the transmitting module;

the transmitting module is configured to: receive the information of the UEs that return the paging responses sent by the load redistribution processing module, as well as the information of the UEs that initiate the location update and the information of the UEs that initiate the attach request, and distribute a TMSI including the Null-NRI and a non-broadcast location area identity to these UEs, wherein, the transmitting module is configured to distribute a TMSI including the Null-NRI and a non-broadcast location area identity to the UEs that return the paging responses via the TMSI redistribution message;

in the preferred embodiment, the transmitting module is also configured to: after distributing a TMSI including the Null-NRI and a non-broadcast location area identity to the UEs that initiate a location update or an attach request, notify the load redistribution processing module that the distribution operation has been completed, at this time, the load redistribution processing module knows that the load redistribution has been completed according to the received notification, so it indicates the UE in the VLR as load redistribution completed (for example, the UE is marked as the state of "load redistribution completed"), wherein, the identification information indicating whether the load redistribution is performed on UEor not is only effective in this load redistribution process (including the first and second stages); therefore, in the process of the load redistribution processing module performing the paging processing on the UEs in the VLR of the MSC node sequentially, if the load redistribution processing module further judges whether the load redistribution has been performed on each of the UEs in the VLR or not (for example, judge whether the UE is marked as the state of "load redistribution completed" or not), the load redistribution processing module can only send paging messages to the UEs on which the load redistribution is performed (for example, the UEs are marked as the state of "load redistribution not completed" or UEs are not marked), which can avoid performing repeat processing on the UEs that have already performed redistribution.

The network management system 105 is configured to: be mainly used to connect with one or more mobile switching centers, operate and maintain the mobile switching centers, as well as initiate a "dummy paging" fast load redistribution command to the mobile switching center and acquire the progress and implementation result information of the load redistribution from the mobile switching center.

Figure 2:
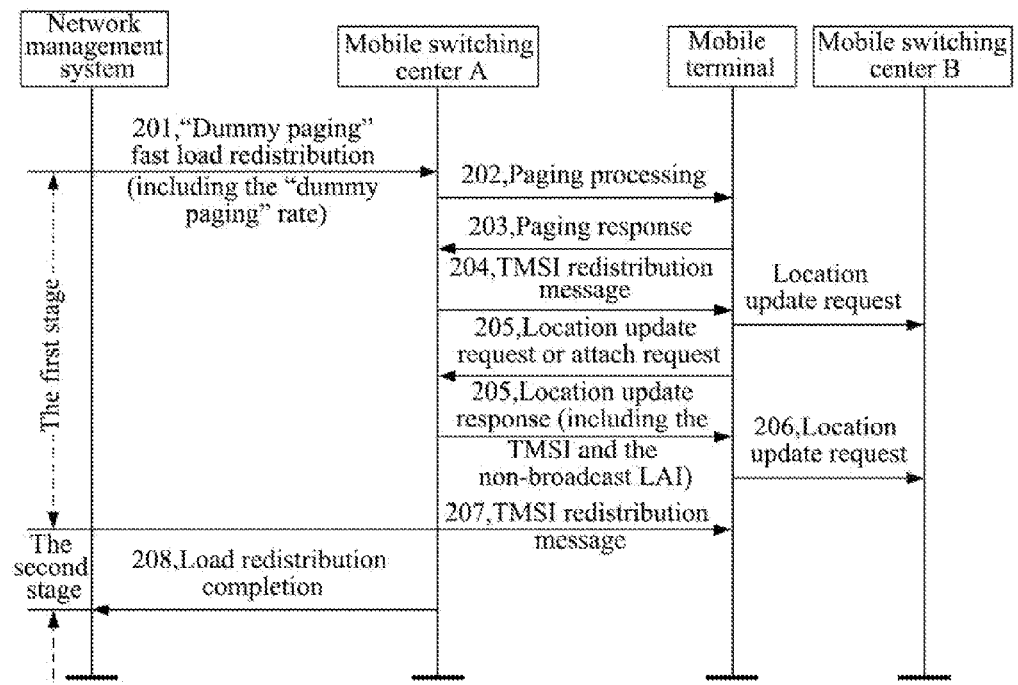
FIG. 2 is a flow chart of a system for implementing "dummy paging" fast load redistribution in accordance with the present invention.

In the following, the process of the aforementioned system implementing the fast load redistribution is described in detail, as shown in FIG. 2, the process comprises the following steps:

in step 201, the operator initiates the "dummy paging" fast load redistribution to a certain MSC node through the network management system, and the "dummy paging" fast load redistribution comprises the "dummy paging" rate, wherein, the operator provides a "dummy paging" rate (that is, the set paging rate) in accordance with the network capacity and the current load, and the MSC enters into the first stage of the load redistribution;

specifically, the operator can use the operations and maintenance (O&M) command to initiate the "dummy paging" fast load redistribution to a certain MSC node, wherein, the operator needs to select an appropriate "dummy paging" rate to reduce the impact on other network elements, for example, in the end office traffic model, the traffic occupied by the calls and short messages are the most, therefore, the "dummy paging" rate can be selected by referring to the sum of two kinds of traffic and in accordance with the difference between the current traffic and the busy traffic, the specific formula is as equation (1):

$$V_{page}=C*(N_{sms}+N_{mt})/3600 \qquad \text{equation (1)}$$

wherein the $V_{page}$ is the "dummy paging" rate; and C is the user capacity of the MSC office;

$N_{sms}$ is the number of times that the user short message is called when busy and $N_{mt}$ is the number of times that the user call is called when busy;

If the number of times of short message being called is about 2.5 times/busy, and the number of the times of call being called is about 0.75 times/busy, in accordance with the above formula, for one million office (that is, the user capacity is 1 million), the number of the initiated paging per second is (1000000*3.25)/3600=902 times, for 2 million office, the number of the initiated paging per second is about 1800 times.

In Step 202, the MSC performs the paging processing on the UEs in the VLR in turn according to the "dummy paging" rate specified by the operator (that is, a paging request is sent to all the UEs in the VLR in turn);

in this step, in the process of the MSC performing the paging processing on the UEs in turn, those UEs on which the load redistribution has already been performed (for example, those UEs that are marked as the state of "load redistribution completed") are skipped, therefore, those UEs on which the load redistribution has already been performed are not rehandled, wherein the UEs on which the load redistribution has already been performed refer to: the UEs that have initiated the location update or attach request to the MSC and to which a TMSI including the Null-NRI and a non-broadcast location area identity have been distributed by the MSC before the MSC performs the paging processing. The specific operation procedure can refer to operation in step 205, wherein the identification information indicating whether the load redistribution is performed on UE or not is only effective in the present load redistribution process (including the first and second stages);

in step 203, when the MSC receives the paging response returned by the mobile terminal, the MSC distributes a TMSI including the null-NRI and a non-broadcast location area identity to the mobile terminal, and the MSC marks the mobile terminal in the VLR as the state of "load redistribution completed";

in this step, the MSC can distribute a TMSI including the Null-NRI and a non-broadcast location area identity to the mobile terminal through the TMSI redistribution message.

In step 204, after the mobile terminal receives the non-broadcast location area identity, it uses the newly distributed TMSI to perform the location update immediately, however, since the TMSI contains the null-NRI, the NNSF module routes the UE to one new MSC node, proceed to step 207;

in step 205, in the operation process of steps 202 and 203, if other mobile terminal initiates a Location Update or Attach Request to the MSC, the MSC distributes a TMSI including the null-NRI to the mobile terminal in accordance with the requirements of the 3GPP TS 23.236 protocol, and it includes the Non-broadcast LAI information in the response message, at the same time, the mobile terminal in the VLR is marked as the state of "load redistribution completed";

in step 206, after the mobile terminal receives the non-broadcast location area identity, it uses the newly distributed TMSI to perform the location update immediately, since the TMSI contains the Null-NRI, the NNSF module routes the UE to one new MSC node;

in step 207, after the MSC performs the "dummy paging" processing on all the UEs in the VLR, it enters into the second stage, the MSC sequentially processes the UEs whose service is kept and initiates the TMSI redistribution process, and it distributes the TMSI including the Null-NRI and the non-broadcast location area identity to the UEs, and when the service is completed, the terminal uses the newly distributed TMSI to perform the location update immediately, thereby it is routed to a new MSC node;

wherein, the MSC completing the "dummy paging" processing on all the UEs in the VLR refers that, the MSC initiates the "dummy paging" to all the UEs in the VLR, at this time, the first stage of the load redistribution is considered as completed.

In step 208, after the completion of the second stage, the MSC returns a load redistribution completion message to the network management system.

It can be seen from the aforementioned embodiment that the technical solution of the present invention has the following advantages:

1, compared with the load redistribution process defined in the existing 3GPP protocol, the technical solution of the present invention can effectively shorten the time length of the first stage of the load redistribution process, so as to meet the needs of the specific scenery which has a higher requirement for time and improve the maintainability of the network operation. For example, the time length of the first stage in the load redistribution process defined in the existing 3GPP protocol is the time length of two periodic location update, usually 2*1 hours, while using the technical solution of the present invention, the time length of the first stage can refer to Table 1, and it can be seen from Table 1 that when the number of the UEs is 1 million, the time length of the first stage is inversely proportional to the "dummy paging" rate set by the operator;

TABLE 1 rate and time length of the dummy paging fast load redistribution

| The number of UEs | "dummy paging" rate | Time length of the first stage |
|---|---|---|
| 1 million | 1000 times/second | About 17 minutes |
| 1 million | 500 times/second | About 33 minutes |

Note:
in the first stage, since the UE triggers the TMSI redistribution by actively initiating the location update or the attach request and the MSC does not re-handle such kind of UEs, the time consumed by the first stage will be less than the time length calculated theoretically.

2, the technical solution of the present invention adopts the method of using the dummy paging to wake up the user, so the operators can perform the load redistribution for the specified user (IMSI or the Mobile Station International Subscriber Directory Number (MSISDN) without having to wait passively for the location update or attach request of UE to perform the load redistribution operation.

3, in the technical solution of the present invention, at the same time when the MSC sequentially processes the UEs in the VLR in accordance with the specified paging rate, there exists a case that user performs the location update or attach request, at this time, the user data in the VLR is not immediately deleted, therefore, for the UEs on which the load redistribution has been performed, the second load redistribution processing is not needed.

Those skilled in the field can understand that all or part of the steps in the aforementioned method can be completed by instructing related hardware with the program, said program can be stored in a computer readable storage medium, such as read-only memory, magnetic disk, or CD-ROM and so on. Optionally, all or part of the steps in the aforementioned embodiment can be implemented by one or more integrated circuits. Accordingly, each module/unit in the aforementioned embodiment can be implemented in the form of hardware or software function modules. The present invention is not limited to any particular form of combination of hardware and software.

The above description is only a specific implementation of the present invention, but the protection scope of the present invention is not limited to the above description, and those skilled in the field can easily think of change or replacement within the technical scope disclosed in the present invention, and all these changes and replacements should be included within the protection scope of the present invention. Therefore, the protection scope of the present invention should be based on the protection scope of the claims.

INDUSTRIAL APPLICABILITY

The technical solution of the present invention awakes a user through active paging on the basis of the 3GPP TS 23.236 protocol, and thereby it can effectively reduce the time consumed by the load redistribution, achieve fast load redistribution and improve the efficiency of network operation by cooperating with the first-stage processing mechanism in the existing load redistribution process.

What is claimed is:

1. A method for implementing load redistribution, comprising:
when a mobile switching center (MSC) node in a MSC pool needs load redistribution, the MSC node sequentially performing paging processing on user equipments (UEs) in a visitor location register of the MSC node according to a set paging rate and distributing a Temporary Mobile Subscriber Identity (TMSI) including null network resource identifier (Null-NRI) and a non-broadcast location area identity to UE that returns a paging response, thereby achieving the load redistribution of the MSC node;
wherein the visitor location register of the MSC node comprises identification information indicating whether the load redistribution is performed on each UE or not, wherein the identification information indicating whether the load redistribution is performed or not is configured by the MSC node in a process of the UE initiating a location update or attach request; and
before the step of the MSC node performing the paging processing on each UE in the visitor location register, the method further comprises: according to the identification information indicating whether the load redistribution is performed or not, the MSC node judging whether the load redistribution is performed on UE or not, and only performing the paging processing on the UE on which the load redistribution is not performed.

2. The method of claim 1, further comprising:
in a load redistribution process of the MSC node, if the MSC node receives a location update or attach request which is initiated by a certain UE to the MSC node, the MSC node distributing the TMSI including null-NRI and the non-broadcast location area identity to the UE.

3. The method of claim 2, wherein:
the set paging rate is calculated according to a following formula:

$$V_{page}=C*(N_{sms}+N_{mt})/3600$$

wherein, the $V_{page}$ is "dummy paging" rate; and C is user capacity of MSC office;
$N_{sms}$ is the number of times that a user is called by short messages when busy;
and $N_{mt}$ is the number of times that a user is called by calls when busy;
the "dummy paging" refers that the MSC node awakes a user through active paging and performs the load redistribution.

4. The method of claim 3, wherein:
the MSC node distributes the TMSI including Null-NRI and the non-broadcast location area identity to the UE that return the paging response through a TMSI redistribution message.

5. The method of claim 1, wherein:
the set paging rate is calculated according to a following formula:

$$V_{page}=C*(N_{sms}+N_{mt})/3600$$

wherein, the $V_{page}$ is "dummy paging" rate; and C is user capacity of MSC office;
$N_{sms}$ is the number of times that a user is called by short messages when busy;

and $N_{mt}$ is the number of times that a user is called by calls when busy;

the "dummy paging" refers that the MSC node awakes a user through active paging and performs the load redistribution.

6. The method of claim 5, wherein:

the MSC node distributes the TMSI including Null-NRI and the non-broadcast location area identity to the UE that return the paging response through a TMSI redistribution message.

7. A mobile switching center (MSC) for implementing load redistribution, comprising a load redistribution processing module and a transmitting module, wherein:

the load redistribution processing module is configured to: when the MSC is a MSC that needs the load redistribution in a MSC pool, according to a set paging rate, sequentially perform paging processing on user equipments (UEs) in a visitor location register of the MSC, as well as receive a paging response returned by the UE, and send information of the UE that returns the paging response to the transmitting module;

the transmitting module is configured to: receive the information of the UE that returns the paging response sent by the load redistribution processing module, and distribute a Temporary Mobile Subscriber Identity (TMSI) including null network resource identifier (Null-NRI) and a non-broadcast location area identity to the UE;

wherein the load redistribution processing module is further configured to:

in a process of the UE initiating a location update or attach request, configure identification information indicating whether the load redistribution is performed or not for each UE in the visitor location register; and before the load redistribution processing module performs the paging processing on each UE, judge whether the load redistribution is performed on the UE or not according to the identification information indicating whether the load redistribution is performed or not, and only perform the paging processing on the UE on which the load redistribution is not performed.

8. The MSC of claim 7, wherein:

the load redistribution processing module is further configured to: in a load redistribution process of the MSC, receive a location update or attach request initiated by the UE to the MSC and send information of the UE that initiates the location update or attach request to the transmitting module;

the transmitting module is further configured to: receive the information of the UE that initiates the location update or attach request sent by the load redistribution processing module, and distribute the TMSI including Null-NRI and the non-broadcast location area identity to the UE that initiates the location update or attach request.

9. The MSC of claim 8, wherein, the set paging rate is calculated according to a following formula:

$$V_{page}=C*(N_{sms}+N_{mt})/3600$$

wherein the $V_{page}$ is "dummy paging" rate; and C is user capacity of MSC office;

$N_{sms}$ is the number of times that a user is called by short messages when busy;

and $N_{mt}$ is the number of times that a user is called by calls when busy;

the "dummy paging" refers that the MSC awakes a user through active paging and performs the load redistribution.

10. The MSC of claim 9, wherein:

the transmitting module is configured to distribute the TMSI including Null-NRI and the non-broadcast location area identity to the UE that returns the paging response through a TMSI redistribution message.

11. The MSC of claim 7, wherein, the set paging rate is calculated according to a following formula:

$$V_{page}=C*(N_{sms}+N_{mt})/3600$$

wherein the $V_{page}$ is "dummy paging" rate; and C is user capacity of MSC office;

$N_{sms}$ is the number of times that a user is called by short messages when busy;

and $N_{mt}$ is the number of times that a user is called by calls when busy;

the "dummy paging" refers that the MSC awakes a user through active paging and performs the load redistribution.

12. The MSC of claim 11, wherein:

the transmitting module is configured to distribute the TMSI including Null-NRI and the non-broadcast location area identity to the UE that returns the paging response through a TMSI redistribution message.

* * * * *